United States Patent [19]
Brown et al.

[11] Patent Number: 5,897,069
[45] Date of Patent: Apr. 27, 1999

[54] FISHING REEL FRAME

[75] Inventors: David Brown, Tulsa; Rayford A. Cockerham, Broken Arrow, both of Okla.

[73] Assignee: Zebco, Tulsa, Okla.

[21] Appl. No.: 08/911,307

[22] Filed: Aug. 14, 1997

[51] Int. Cl.$^6$ .............................................. A01K 89/015
[52] U.S. Cl. ...................................................... 242/310
[58] Field of Search ................................... 242/310, 312, 242/316

[56] References Cited

U.S. PATENT DOCUMENTS

| 3,677,324 | 7/1972 | Higginbotham et al. .................. 164/60 |
| 3,847,203 | 11/1974 | Northwood .............................. 164/60 |
| 4,858,894 | 8/1989 | LaBate ..................................... 266/265 |
| 5,071,086 | 12/1991 | Roberts et al. . | |
| 5,108,042 | 4/1992 | Puryear et al. . | |
| 5,257,753 | 11/1993 | Sato . | |
| 5,292,087 | 3/1994 | Sato ...................................... 242/310 |
| 5,348,246 | 9/1994 | Kim . | |

FOREIGN PATENT DOCUMENTS

| 4-91736 | 3/1992 | Japan ..................................... 242/310 |
| 4-108330 | 4/1992 | Japan ..................................... 242/310 |

*Primary Examiner*—John P. Darling
*Attorney, Agent, or Firm*—Fellers, Snider, Blankenship, Bailey & Tippens

[57] ABSTRACT

A method for producing fishing reel frames and a fishing reel frame employs a starting piece comprising: a longitudinal first side wall; a longitudinal second side wall having a spaced relationship with the first side wall such that the second side wall is spaced apart from the first side wall; and at least one longitudinal cross-structure holding the first and second side walls in the spaced relationship. The starting piece is preferably an extruded structure. The method comprises the step of machining the starting piece to produce a plurality of individual frames. The method also includes the steps of: (a) forming a series of spool apertures through the first side wall such that each of the individual frames includes a separate one of the spool apertures; (b) forming a series of spool shaft apertures through the second side wall such that each of the individual frames includes a separate one of the spool shaft apertures; and (c) forming feet from those portions of the cross-structure included in the individual frames. The feet are operable for mounting the individual frames on fishing rods. The longitudinal cross-structure is preferably positioned above the bottom of the starting piece whereby the feet formed therefrom are spaced a sufficient distance above the bottoms of the frames to provide low profiles when the frames are mounted on fishing rods.

16 Claims, 11 Drawing Sheets

FISHING REEL FRAME

In one aspect, the present invention relates to baitcast fishing reels. In another aspect, the present invention relates to fishing reel frames and to methods for producing fishing reel frames.

BACKGROUND OF THE INVENTION

Baitcast fishing reels are well known in the art. A baitcasting reel will typically comprise: a split frame having a pair of opposing side plates; a foot, extending from the frame, for attaching the reel to a fishing rod; a line spool, rotatably positioned between the frame side plates, for retrieving and holding a fishing line; a spool shaft, on which the spool is secured, having ends extending through the frame side plates; a pinion gear provided on the spool shaft; a manually operable crank handle for rotating the spool in order to retrieve (i.e., wind) the fishing line; a gear train and crankshaft assembly mechanically linking the crank handle to the spool shaft pinion gear; a level-wind mechanism which transverses the spool during winding to ensure that the fishing line is evenly distributed along the length of the spool; an anti-reverse mechanism for preventing reverse rotation of the crank handle and spool; a clutch mechanism for disengaging the pinion gear from the spool shaft to allow the spool to rotate freely during casting; an exterior actuator (typically a thumb lever) for engaging the clutch; and a spool drag or spool braking mechanism.

In most cases, right and left side covers are removably attached to the frame side plates for housing the various reel operating mechanisms. A right-handed baitcasting reel (i.e., a reel designed for a right-handed user) will typically be structured such that: the spool drag or spool braking mechanism is housed under the left side cover; the crank handle is rotatably mounted outside of the right side cover; and the crankshaft, gear train, pinion gear, clutch, and anti-reverse mechanism are housed under the right side cover. Additionally, right-handed baitcasting reels are commonly configured to provide access to the reel spool by removing the left side cover. With the left cover removed, the spool can typically be removed and/or replaced through an aperture provided in the left side plate of the reel frame.

For sake of convenience, a right-handed perspective is used in describing the various reels and reel components discussed herein. As will be understood by those skilled in the art, a left-handed version of generally any baitcasting reel can be produced by simply reversing the arrangement and structure of the reel's components such that the left-handed reel is a mirror image of the right-handed version of the reel.

Spool drag or spool braking mechanisms are commonly used in baitcasting reels to alleviate line backlashing problems which can occur when casting. Because they utilize transversely oriented spools which rotate during casting, baitcasting reels are more prone to backlashing problems than are spinning reels and spincasting reels. Such problems result primarily from the rotational momentum carried by the spool. The most common types of spool drag/braking mechanisms used in baitcasting reels are magnetic drag systems and centrifugal braking systems.

Two basic styles of reels dominate the baitcasting market. The first consists of traditional baitcasting reels having high, round profiles. The second consists of low profile, contemporary reels having teardrop or generally oval shapes. As used herein, the term "high profile" refers to a baitcasting reel profile wherein, when the reel is secured to a fishing rod, the top of the reel is spaced a relatively high distance above the top of the rod. In contrast, the term "low profile" refers to a baitcasting reel profile wherein, when the reel is secured to a fishing rod, the top of the reel is spaced a relatively short distance above the top of the rod.

Heretofore, traditional, round baitcasting reels have had relatively high profiles due primarily to two factors. The first is a need to employ large frame side plates in order to obtain a round, traditional shape. The second has been the need to position the reel foot at or below the bottom of the reel frame.

The circular frame side plates used in traditional baitcasting reels have typically been relatively large due to the need to (a) encompass various structures and components positioned between the side plates and (b) house all of the reel's operating mechanisms within the reel's circular side covers. The structures and components positioned between the frame side plates include: the reel spool; the level wind-mechanism; and at least two frame support structures. These structures are encompassed between the frame side plates for proper operation and support. Additionally, these structures and components, as well as all of the reel's operating mechanisms, must be encompassed within the reel's circular profile in order to obtain an overall round, traditional shape.

The typical foot structure heretofore employed in a round baitcasting reel has constituted a separate component attached to the outer (bottom) surface of one of the frame supports. The frame support structures are typically positioned around the spool at or near the perimeters of the circular side plates. Consequently, the reel foot has been positioned at, very near to, or below the bottom of the reel. Thus, when mounted on a fishing rod, substantially the entire, large profile of the reel has been positioned above the top of the rod.

Like traditional baitcasting reels, contemporary baitcasting reels are typically structured such that the reel foot is positioned at or below the bottom of the reel. However, to obtain low profiles, contemporary baitcasting reels have been constructed using oval or teardrop-shaped frames. These contemporary frames have forwardly and rearwardly extending sections which allow the attainment of a low profile by positioning the frame support structures and various operating mechanisms in front of and/or behind the reel spool.

As evidenced by the continuing, sizable market for traditional, round baitcasting reels, many users prefer traditional baitcasting reels over contemporary baitcasting reels. Unfortunately, the high profile nature of the traditional, round baitcasting reel presents certain disadvantages. Some users prefer to "palm" a fishing reel during winding. When palming the fishing reel, the user positions one hand around both the reel and the rod and turns the crank handle with the other hand. Many users find that holding the rod and reel in this manner provides comfort and balance. While palming the reel, the user will also typically hold the fishing line such that, during winding, the line passes between the thumb and forefinger of the palming hand. Thus, palming also serves to remove moisture from the line and promotes efficient winding by maintaining a desirable amount of tension on the line during the winding process.

Thus, a need presently exists for a low profile baitcasting reel which has a traditional, round appearance and which provides the above-mentioned benefits and advantages of traditional baitcasting reels.

The processes heretofore used for producing frames for baitcasting reels have significant shortcomings. The most commonly used processes are: die casting, investment casting, forging, and stamping. Investment casting is comparatively labor intensive. Investment casting also allows only limited alloy selection and can yield undesirably high product porosity levels. Forging processes are typically rather expensive due to high tooling costs and extensive machining requirements. Stamping generally requires the formation and attachment of multiple components. Stamping therefore typically affords much less control over dimensional precision and yields products of relatively low overall strength.

Although generally less costly than other frame production methods, die casting processes typically yield lower quality products. Die cast products commonly exhibit high porosity levels, high contamination levels, and high outgassing levels. Aluminum die casting processes typically also require the addition of iron and silicone to aid material flow during the molding process and prevent the molded material from sticking to the die wall. Unfortunately, these additives act to prevent the attainment of a thick, bright, anodized finish. Aluminum die cast frames therefore are commonly either painted and/or mildly anodized. Thus, aluminum die cast frames typically have low corrosion and scratch resistance, low strength, low finishability, and low aesthetic appeal. Additionally, in order to allow acceptable flow of material from one side of the die to the other, the support structures extending between the side plates of a die cast frame must typically be relatively thick.

Thus, a need presently exists for a cost effective method of producing high quality frames for baitcasting reels. A need particularly exists for a cost effective method of producing high quality aluminum frames for baitcasting reels. Such method will preferably provide a high level of dimensional precision and will allow the use of superior alloys. Such method will also preferably facilitate the attainment of a bright, anodized finish and will preferably provide high strength, high scratch resistance, and high corrosion resistance.

SUMMARY OF THE INVENTION

The present invention addresses and satisfies the above-mentioned needs. The invention provides a low profile baitcasting reel having a traditional, round shape. Users can readily palm the inventive reel to obtain greater comfort, improved winding efficiency, and better balance. The inventive reel preferably includes a novel frame having an integral foot structure spaced a substantial distance above the bottom of the frame. The frame is produced by an inventive method which provides a high strength uni-directional grain structure, allows substantially unlimited alloy selection, eliminates or greatly reduces the need for additives deleterious to anodizing and finishing, and provides high dimensional precision. The inventive method also allows and/or provides: low porosity; a thick (i.e., 0.0004 inches or greater), bright, attractive, anodized finish; and high corrosion and scratch resistance.

In one aspect, the present invention provides a fishing reel comprising a frame and a mounting means for mounting the fishing reel on a fishing rod. The topmost point of the frame is spaced a first distance above the bottommost point of the frame. The bottom of the mounting means is spaced above the bottommost point of the frame a second distance in the range of from about 15 percent to about 40 percent of the first distance.

In another aspect, the present invention provides a frame for a fishing reel comprising: a first side plate; a second side plate spaced apart from the first side plate; and a mounting means, positioned between the first and second side plates, for mounting the frame on a fishing rod. The topmost point of the frame is spaced a first distance above the bottommost point of the frame. The mounting means has a bottom portion spaced a second distance above the bottommost point of the frame. Said second distance is in the range of from about 15 percent to about 40 percent of said first distance.

In another aspect, the present invention provides a baitcast fishing reel comprising (a) a reel housing having a traditional round profile and (b) mounting means for mounting the reel housing on a fishing rod such that the baitcast fishing reel has a low profile.

In another aspect, the present invention provides a method of producing fishing reel frames from an extruded starting piece. The extruded starting piece comprises a longitudinal first side wall and a longitudinal second side wall. The second side wall has a spaced relationship with respect to the first side wall such that the second side wall is spaced apart from the first side wall. The method comprises the step of machining the extruded starting piece to produce therefrom a plurality of individual fishing reel frames.

In another aspect, the present invention provides a method of producing fishing reel frames from a starting piece wherein the starting piece comprises (a) a longitudinal first side wall and (b) a longitudinal second side wall having a spaced relationship with respect to the first side wall such that the second side wall is spaced apart from the first side wall. The method comprises the steps of (a) forming a series of apertures through the first side wall and (b) severing the starting piece to produce therefrom a plurality of individual frames. Each of the individual frames includes a separate one of the apertures.

In another aspect, the present invention provides a method for producing fishing reel frames comprising the steps of (a) severing an elongate starting piece to produce therefrom a plurality of individual frames and (b) forming mounting means for mounting the individual frames on fishing rods. The elongate starting piece comprises: a longitudinal first side wall; a longitudinal second side wall having a spaced relationship with respect to the first side wall such that the second side wall is spaced apart from the first side wall; and at least one cross-structure holding the first and second side walls in the spaced relationship. Each of the individual frames comprises a separate portion of the first side wall, a separate portion of the second side wall, and a separate portion of the cross-structure. The mounting means produced in step (b) are formed from the portions of the cross-structure included in the individual frames.

In yet another aspect, the present invention provides a frame for a fishing reel comprising a uni-directional grain structure. The frame is preferably a unitary structure having the uni-directional grain structure, said unitary structure comprising: a fiapart from a second wall spaced apart from the first wall; and a support structure extending between the first wall and the second wall.

Further objects, features, and advantages of the present invention will be apparent to those skilled in the art upon examining the accompanying drawings and upon reading the following description of the preferred embodiments.

DESCRIPTION OF THE PREFERRED EMBODIMENT

An embodiment 2 of the baitcasting reel provided by the present invention is depicted in FIGS. 1–5. Inventive reel 2 preferably comprises: an embodiment 4 of the inventive baitcasting reel frame; a line spool 6 rotatably mounted between the circular right side plate 8 and the circular left side plate 10 of frame 4; an elongate spool shaft 7 on which spool 6 is secured; a right side cover 12 removably attached over right side plate 8; a crank handle 14 projecting from right cover 12; a level wind mechanism 16 which traverses spool 6 during winding to ensure that the fishing line is evenly distributed along the length of spool 6; a foot structure 18, integrally formed with frame 4, for mounting inventive reel 2 on a fishing rod; and a left side cover 20 removably attachable over left side plate 10 of frame 4. When assembled, frame 4 and covers 12 and 20 provide a housing 13 for the reel's various operating structures and mechanisms. Although inventive reel 2 is depicted in FIGS. 1–5 as a right-handed baitcasting reel, it will be understood by those skilled in the art that the present invention is equally applicable to left-handed baitcasting reels.

Figure 4:
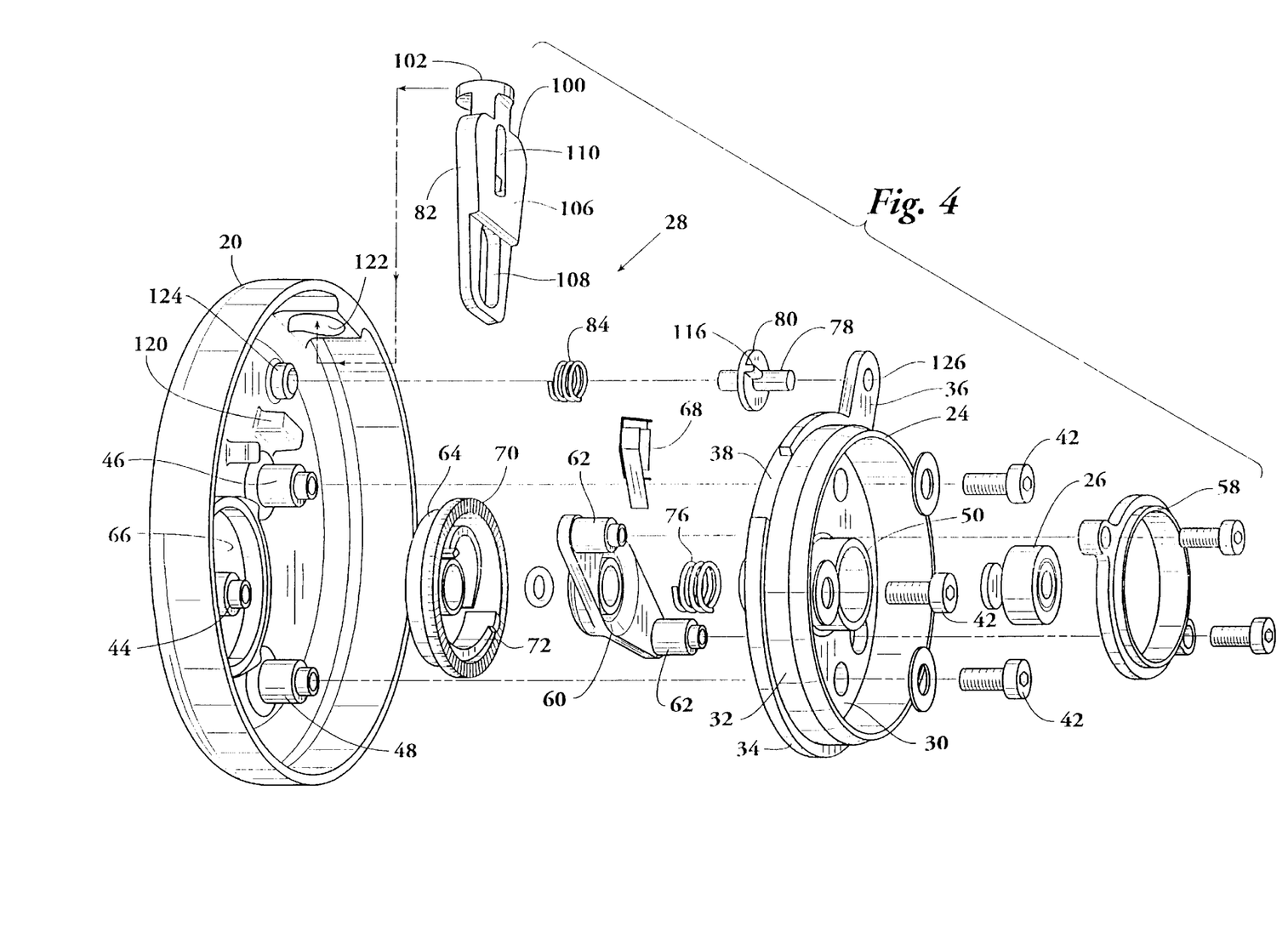
FIG. 4 provides an exploded perspective view of the left side cover assembly 28 of inventive reel 2.

The left cover 20 of inventive reel 2 preferably houses a centrifugal braking system 22, a spool-retaining piece 26, a spool shaft bearing 24, and an assembly 28 for securing and holding left cover 20 on the left side plate 10 of frame 4.

Spool retainer 26 comprises: a circular retaining plate 30; a substantially cylindrical outer wall 32 surrounding retaining plate 30; an exterior flange 34 projecting radially outward from outer wall 32; and a flat, radial ear 36 projecting outwardly from exterior flange 34. A pair of notches 38 are provided in exterior flange 34 for operably receiving a pair of cover-retaining members 40. Spool retainer 26 is secured to the interior of left cover 20 by means of bolts 42. Bolts 42 extend through circular retaining plate 30 and are received in threaded bosses 44, 46, and 48 formed in the interior of cover 20.

Spool retainer 26 further comprises a cylindrical bearing cup 50, projecting from the inside surface of retaining plate 30, and a brake assembly guidepost 52 projecting from the outside surface of retaining plate 30. Bearing cup 50 holds spool bearing 24. Bearing 24 can be retained in bearing cup 50 either by press fitting or by using a clip ring or by any other means commonly employed in the art.

Figure 1:
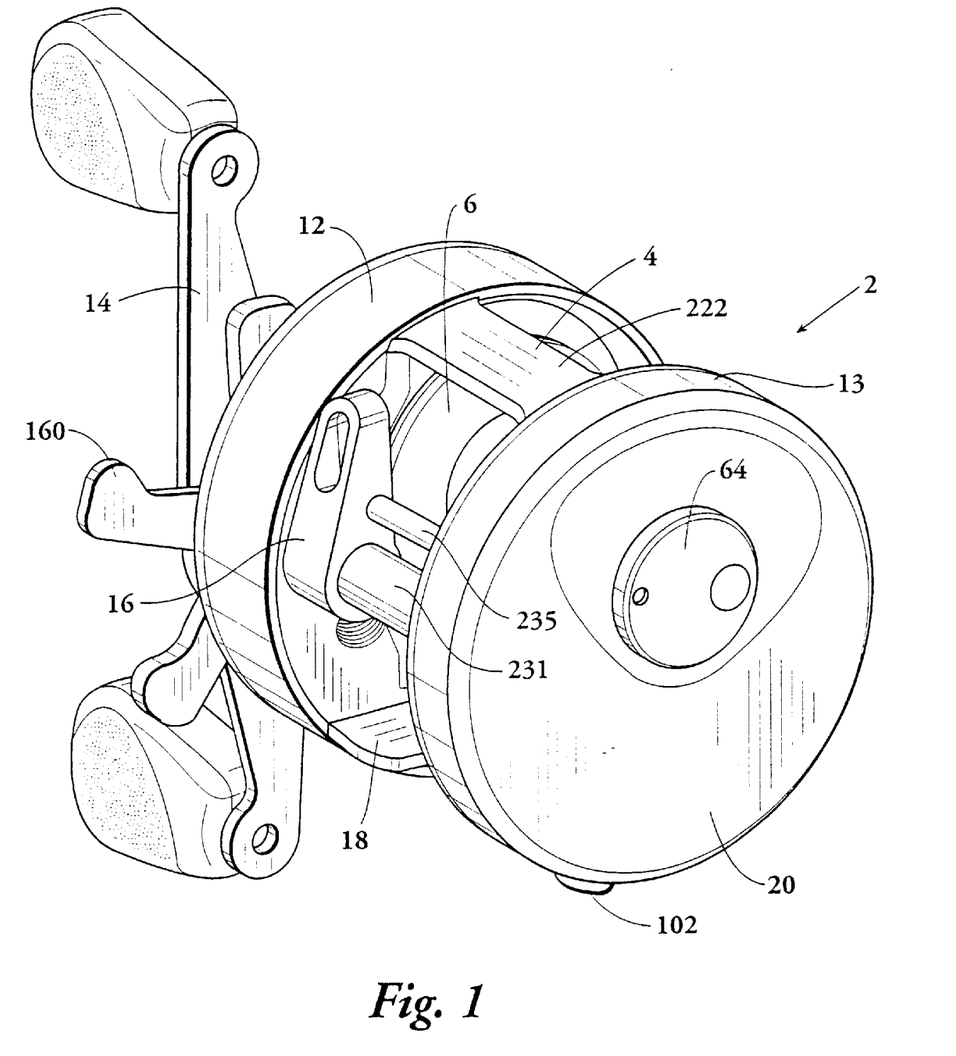
FIG. 1 provides a left side perspective view of an embodiment 2 of the inventive baitcasting reel.
Figure 2:
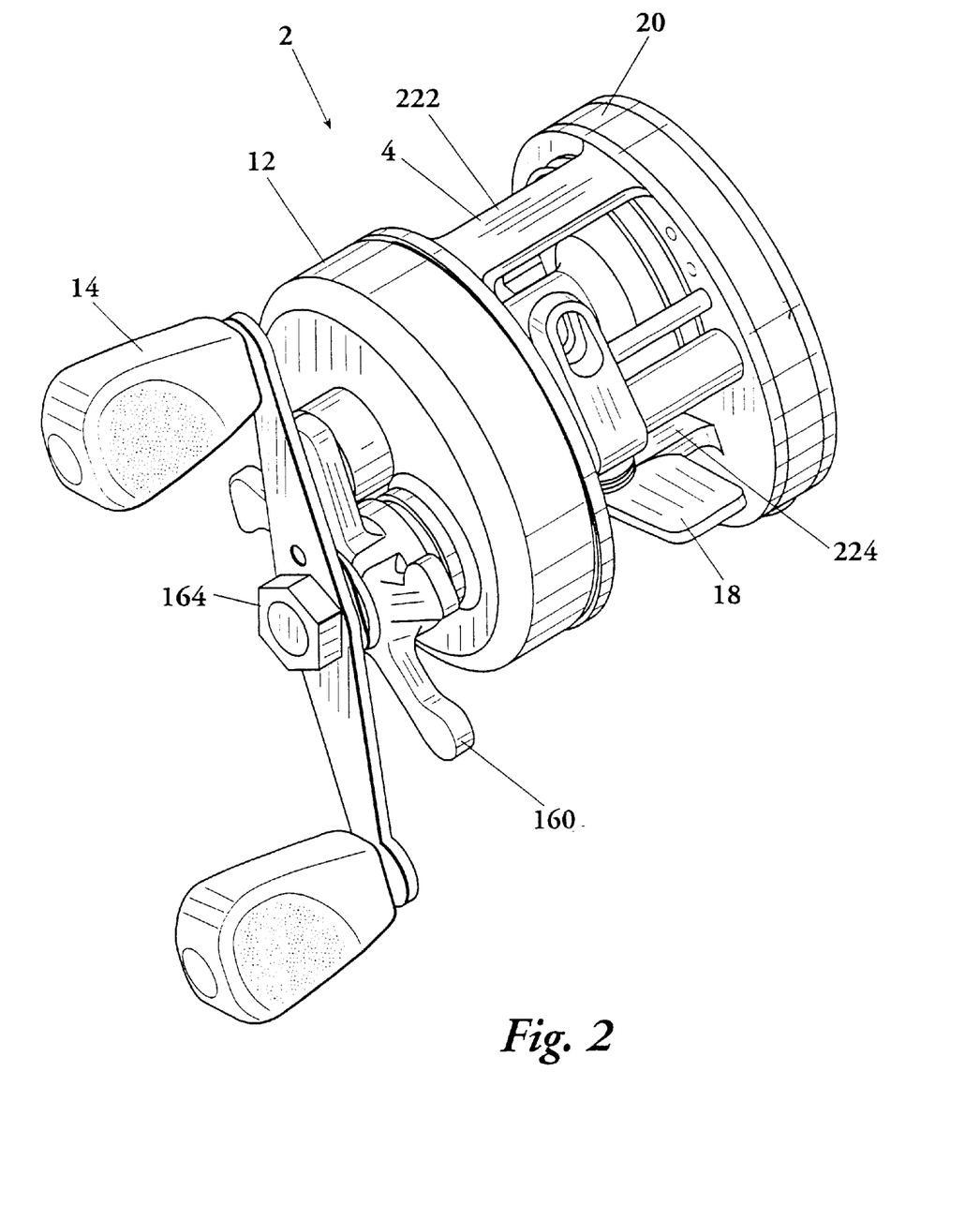
FIG. 2 provides a right side perspective view of inventive reel 2.
Figure 3:
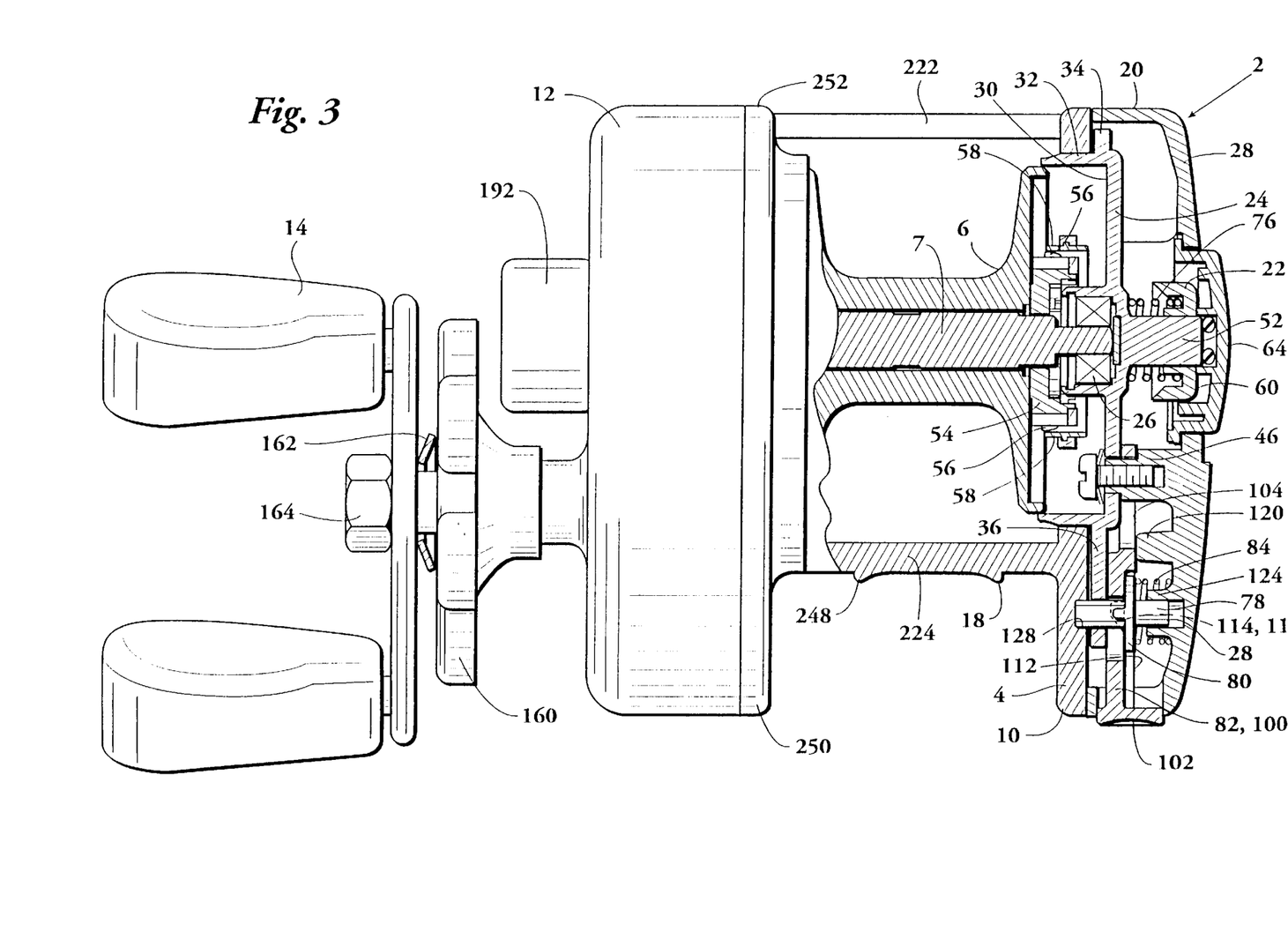
FIG. 3 provides a partially cutaway, elevational, front view of inventive reel 2.
Figures 6, 7, 8:
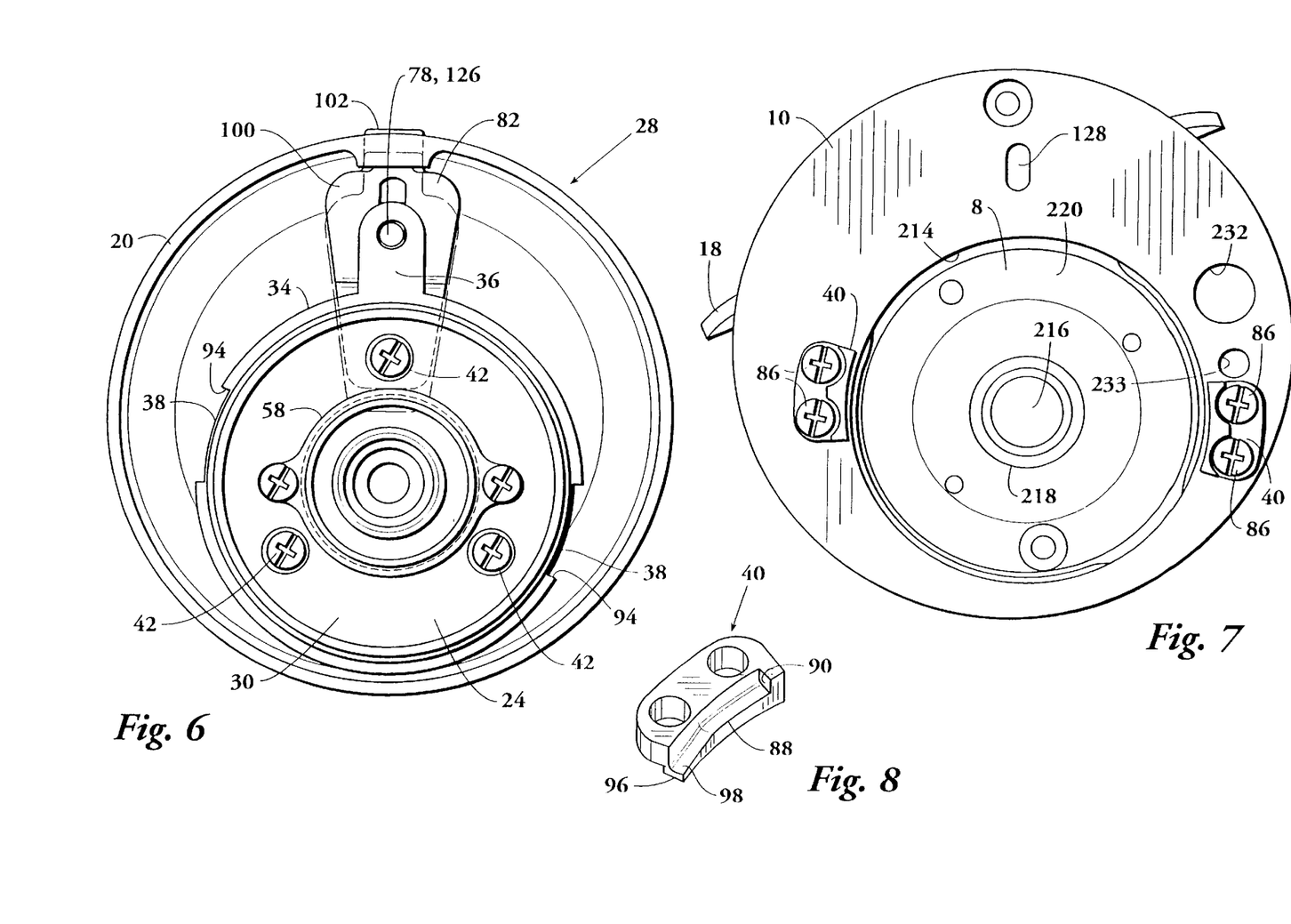
FIG. 6 provides an elevational interior view of left cover assembly 28.
FIG. 7 provides an exterior view of the left side of inventive frame 4.
FIG. 8 provides a perspective view of a cover retaining member 40 used in inventive reel 2.

As will be apparent to those skilled in the art, generally any type of spool drag or spool braking system can be used in inventive reel 2. As depicted in FIGS. 3, 4, and 6, the spool braking/drag system 22 used in inventive reel 2 is preferably an adjustable, centrifugal braking system comprising: a brake pad housing 54 which is press fit onto spool shaft 7 such that housing 54 rotates with spool 6 during casting; a plurality of brake pads 56 which slide radially outward in response to the rotation of housing 54; a brake ring 58 selectively positionable around housing 54 such that, during casting, some or all of brake pads 56 will contact brake ring 58; a cam slider 60 having threaded bosses 62 to which brake ring 58 is attached; a brake adjustment dial 64 projecting through an aperture 66 provided in left cover 20; and a clicker spring 68, secured in cover 20, for providing an audible indication of dial movement by interacting with serrations 70 provided on dial 64.

Cam bosses 62 are slidably received through apertures provided in retaining plate 30. Thus, the user can selectively move cam slider 60 and brake ring 58 axially (i.e., along the rotational axis of spool shaft 7 and brake housing 54) for adjusting the amount of braking force generated by braking system 22. Cam ramps 72 are provided in dial 64 and on cam slider 60 such that the axial positions of cam slider 60 and brake ring 58 can be adjusted by turning dial 64. A biasing spring 76 positioned between cam slider 60 and spool retainer 26 holds the cam ramps in operative engagement.

As depicted in FIGS. 3, 4, and 6–8, the attachment assembly 28 used for securing left cover 20 to frame 4 preferably comprises: flange-retaining members 40 secured to the exterior surface of frame plate 10; a locking pin 78 having a radial center plate 80 with radial operating ridges 116 provided thereon; an actuator 82; and a biasing spring 84. Locking pin 78, actuator 82, and spring 84 are operably retained within left cover 20 by spool-retaining piece 26.

Cover-retaining members 40 are secured by bolts 86 to the outer surface of frame side plate 10. Each retaining member 40 includes a lip 88 under which the radial flange 34 of spool retainer 26 is received and retained. A stop 90 is provided at one end of lip 88.

Retaining members 40 are positioned on frame plate 10 such that, when left cover 20 is placed against frame plate 10, retaining members 40 are received through the notches 38 provided in retainer flange 34. Retaining members 40 are also positioned adjacent the spool aperture 92 provided in frame plate 10 whereby, when left cover 20 is secured to frame 4, spool bearing 26 is properly aligned with spool shaft 7 and adjustable brake ring 58 is properly aligned with brake pad housing 54.

By placing retaining members 40 in flange notches 38 and then rotating left cover 20 clockwise with respect to frame 4, the notch edges 94 of spool retainer flange 34 are received under the leading ends 96 of retaining lips 88. As shown in FIG. 8, at least the initial portions of lips 88 are preferably inclined such that, as the user rotates cover 20 clockwise, the sliding engagement of notched edges 94 with the inclined portions of lips 88 pulls flange 34 and cover 20 toward the outer surface of frame plate 10. Thus, when flange 34 is fully received under lips 88 with notch edges 94 abutting stops 90, cover 20 is snugly held against frame plate 10.

Actuator 82 preferably comprises an elongate actuator plate 100 having a button 102 formed on the outer end thereof. Actuator plate 100 includes: a flat outward side 104; a tiered inner side 106; a first longitudinal slot 108 for receiving cover boss 46; a second longitudinal slot 110 sized for receiving the inward end of locking pin 78; a depression 112, sized for receiving locking pin center plate 80, formed in outward side 104; and a lateral groove 114, formed in the interior of depression 112, for receiving locking pin ridges 116. Lateral groove 114 includes an inclined back wall 118 which interacts with ridges 116 for operating locking pin 78.

Actuator 82 is operably retained in left cover 20 to allow reciprocating movement of button 20 and actuator plate 100. As shown in FIG. 3, actuator 82 is preferably retained such that (a) actuator plate 100 is slidably retained between spool retainer 26 and a smooth boss 120 formed in left cover 20, (b) cover boss 46 is received through actuator slot 108, and (c) actuator button 102 operably projects from a button aperture 122 formed through the side wall of cover 20. Bosses 46 and 120 act with spool retainer 26 to guide the movement of actuator 82 such that actuator 82 is constrained to reciprocate in a substantially linear, non-rotating manner.

Locking pin 78 is operably retained in left cover 20 for reciprocating movement along its longitudinal axis. Locking pin 78 is preferably held such that (a) the outward end of locking pin 78 is reciprocatingly retained in a pin boss 124 provided in cover 20, (b) locking pin center plate 80 is located between actuator plate 100 and cover 20, (c) locking pin ridges 116 are received in actuator lateral groove 114, (d) the inward end of locking pin 78 projects through actuator slot 110 and through an aperture 126 formed through spool retainer ear 36, and (e) spring 84 is positioned around pin boss 124 between cover 20 and locking pin center plate 80. Pin boss 124 and retainer ear aperture 126 guide the axial reciprocating movement of locking pin 78.

A slot 128 is formed in the exterior surface of frame plate 10 for receiving the inward end of locking pin 78 and thereby locking cover 20 in fixed position on frame 4. Slot 128 is positioned such that locking pin 78 is received in slot 128 when the notch edges 94 of spool retainer 26 abut the stops 90 provided in flange-retaining members 40. Locking pin 78 is preferably aligned such that: (a) the longitudinal axis of locking pin 78 is substantially perpendicular to the line of reciprocation of actuator 82 and (b) when locking pin 78 is received in frame slot 128, the longitudinal axis of locking pin 78 is substantially perpendicular to the exterior surface of frame plate 10. Spring 84 acts to hold locking pin ridges 116 in actuator lateral groove 114 and to bias locking pin 78 toward engagement with frame slot 128.

Locking pin 78 can be easily removed from frame slot 128 by simply pressing actuator button 102. When the user presses button 102, actuator 82 moves inwardly such that the inclined back wall 118 of lateral groove 114 slides across locking pin ridges 116. The sliding movement of inclined wall 118 across ridges 116 pulls locking pin 78 out of frame slot 128. With locking pin 78 retracted from frame slot 128, the user can easily remove cover 20 from frame plate 10 by rotating cover 20 a few degrees with respect to frame 4 to thus remove spool-retainer flange 34 from beneath the lips 88 of retaining members 40.

When the user releases actuator button 102, spring 84 operates to return button 102 to its original position by urging pin ridges 116 against the inclined back wall 118 of lateral groove 114 and thereby pushing actuator 82 outward.

Figure 5A:
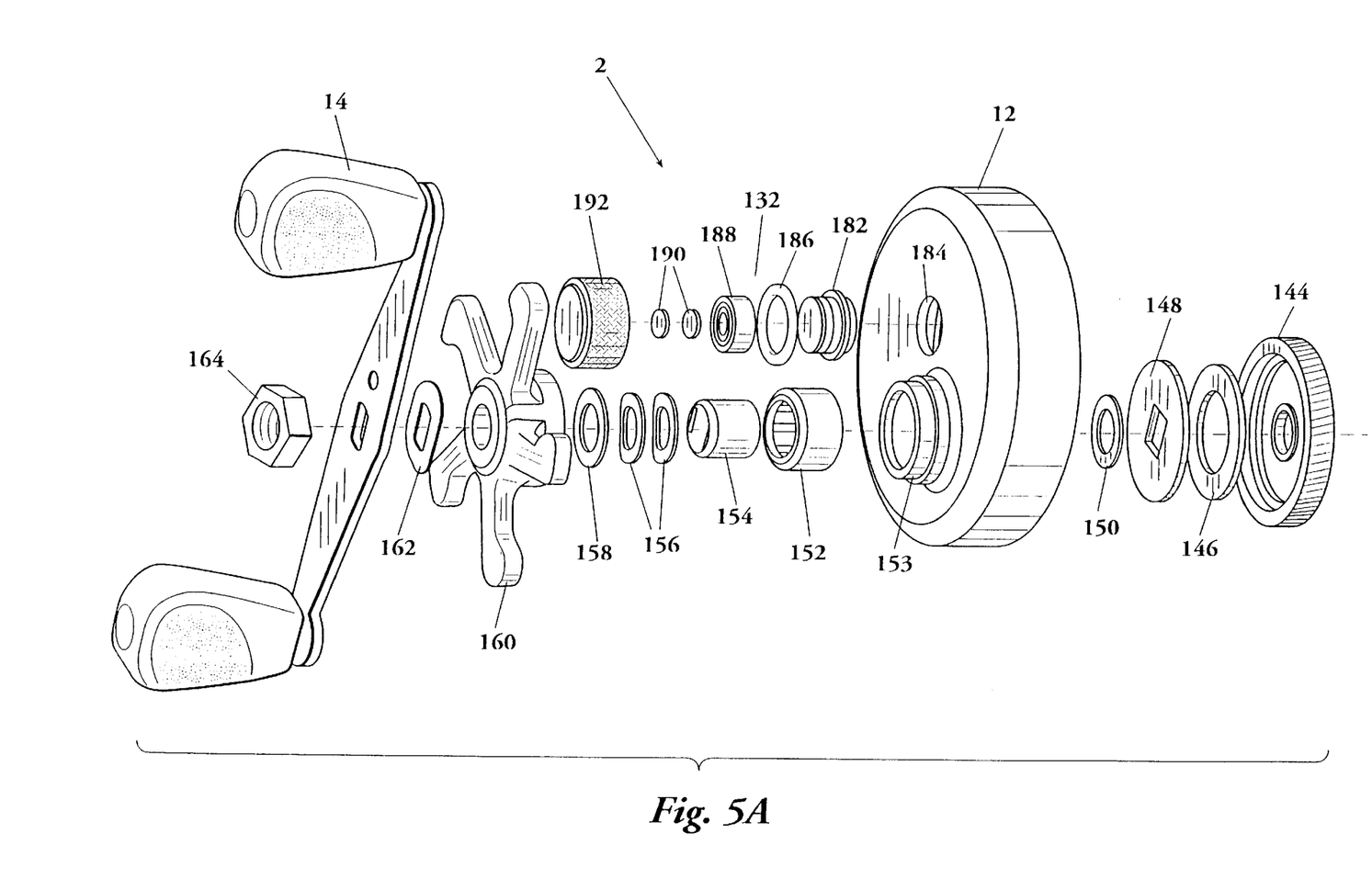
FIGS. 5A and 5B provide an exploded perspective view of the right side cover assembly of inventive reel 2.
Figure 5B:
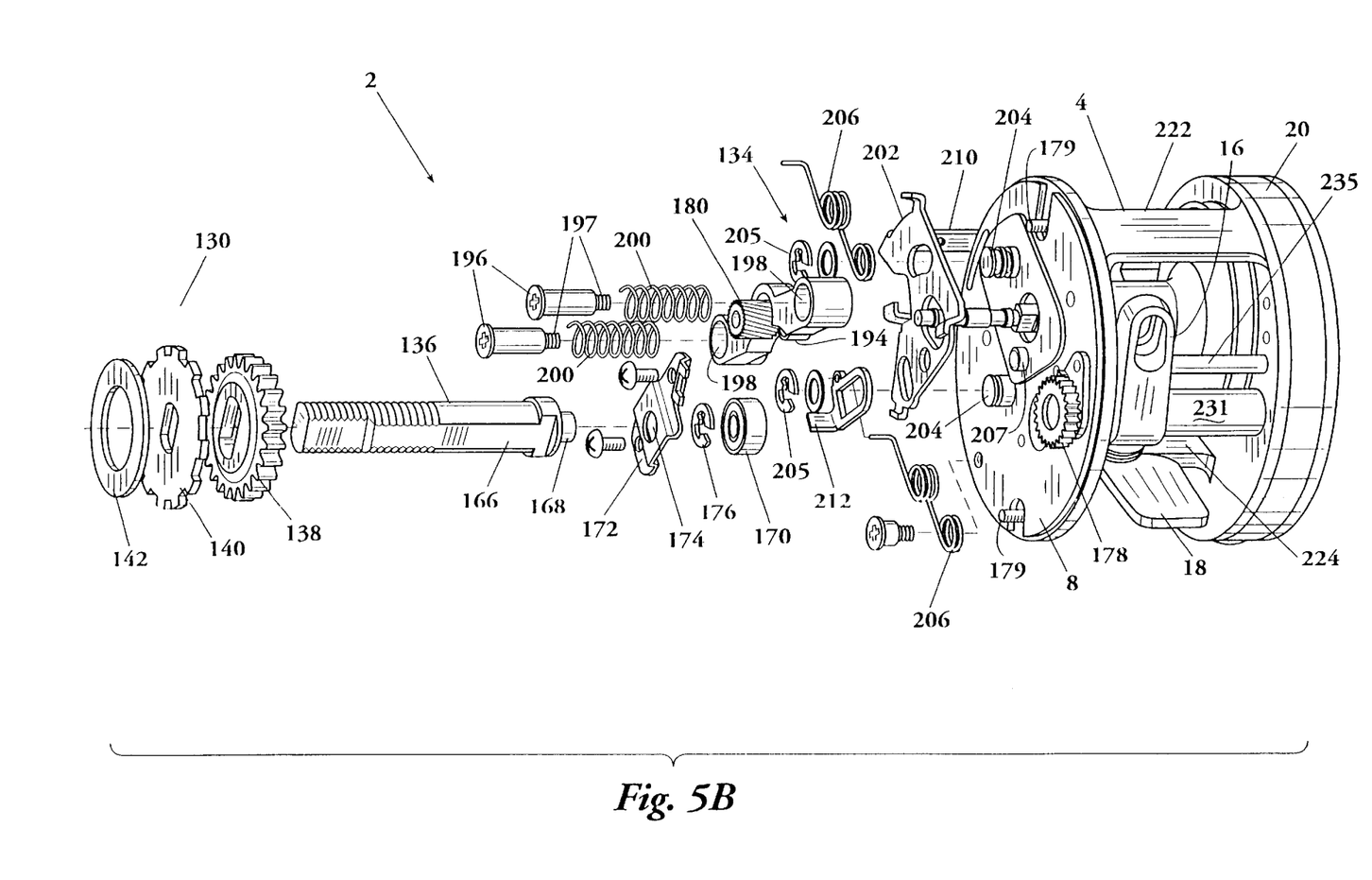

FIG. 5 provides an exploded view of the right hand side of inventive reel 2. The components and structures positioned on the right hand side of inventive reel 2 include: a crankshaft assembly 130; a spool tensioning assembly 132; and a casting actuator assembly 134. Crankshaft assembly 130, spool tensioning assembly 132, and actuator assembly 134 are each of a type commonly used in the art.

Crankshaft assembly 130 comprises a crankshaft 136 having thereon: a level wind gear 138; a trip rachet 140; a first friction washer 142; a drive gear 144; a second friction washer 146; a drag washer 148; a washer 150; a clutch 152 retained in an open boss 153 projecting from right side cover 12; a clutch sleeve 154 received in clutch 152; a pair of exterior drag washers 156; a washer 158; a drag star 160; and a spring washer 162. Crank handle 14 is secured on the exterior end of crankshaft 136 by nut 164. To ensure that level wind gear 138, trip ratchet 140, clutch sleeve 154, spring washer 162, and drag washers 148 and 156 are constrained to always rotate with crankshaft 136, these components are keyed onto flat surfaces 166 formed on crankshaft 136.

As part of the drag system used in reel 2, drive gear 144 is not keyed onto crank shaft 136. Instead, drive gear 144 is caused to rotate with crankshaft 136 as a result of being clamped between trip ratchet 144 and drag washer 148. The drag system thus permits an adjustable degree of rotational slippage of drive gear 144 on crankshaft 136 such that, when an excessive pulling force is applied to the fishing line, a sufficient amount of additional line is released to prevent the line from breaking.

The amount of clamping/drag force applied to drive gear 144 can be selectively adjusted by turning drag star 160. Drag star 160 is threadedly received on the exterior end of crank shaft 136 such that, by turning drag star 160 clockwise, an increased clamping/drag force is applied to drive gear 144. Alternatively, the clamping/drag force applied to drive gear 144 can be reduced by turning drag star 160 counter clockwise.

To allow rotational movement of crankshaft 136, the interior end 168 thereof is positioned in a bearing 170. A retainer 172 holds bearing 170 in a depression 236 provided in right side plate 8. In order to ensure that interior end 168 is retained in bearing 170 and to prevent crankshaft 136 from moving longitudinally, an E-clip 176 is used to retain interior end 168 in an aperture 174 provided through retainer 172. As will be understood by those skilled in the art, E-clip 176 clips into a shallow groove (not shown) provided around the exterior of end 168.

Level wind gear 138 operably engages a worm shaft gear 178 positioned adjacent right side plate 8. Gear 178 is attached to the end of a worm shaft rotatably contained within the level wind mechanism. As will be understood by those skilled in the art, worm shafts are commonly used in level wind mechanisms to cause the mechanism to move back and forth across the line spool during winding.

The drive gear 144 included in crankshaft assembly 130 operably engages a pinion gear 180 provided on the end of spool shaft 7. As a result of the operative engagement of gears 144 and 180, the user can rotate line spool 6 by turning crank handle 14.

Spool tension assembly 132 is operable for adjusting the amount of retaining stress applied to the ends of spool shaft 7 in order to regulate, to some degree, the rotational freedom of line spool 6. Spool tension assembly 132 comprises: a tension boss 182 having its inner end pressed into an aperture 184 provided through the wall of right side cover 12; an O-ring 186 positioned around the outer portion of tension boss 182; a bearing 188 positioned in boss 182 for receiving the end of spool shaft 7; a pair of spool washers 190 positioned on bearing 188; and a tension knob 192 threadedly received knob 192 on over bearing 188. Due to the threaded attachment of tension knob 192 on tension boss 182, the amount of tension applied to the ends of spool shaft 7 can be increased by manually turning tension knob 192 clockwise.

Casting actuator assembly 134 comprises: a pinion yoke 194 for moving pinion gear 180 longitudinally on spool shaft 7; a pair of elongate retainers 196 attached to right side plate 8 by means of threaded ends 197; a pair of biasing springs 192 held by retainers 196 for biasing pinion yoke 94 and pinion gear 180 toward side plate 8; a release slider 202 pivotably retained by guideposts 204 and E-clips 205; a pair of torsion springs 206 attached between slider 202 and side plate 8 for biasing slider 202 away from engagement with pinion yoke 194; a thumb lever 210 extending from release slider 202; and a kick lever 212 provided on release slider 202 for engaging crankshaft trip ratchet 140. Elongate retainers 196 are received through yoke apertures 198 such that yoke 194 will slide on retainers 196 toward and away from right side plate 8.

Right cover 12 is removably attached to frame 4 by means of bolts 179. Bolts 179 project outwardly through frame side plate 8 and are received in threaded bosses provided in the interior of cover 12.

As shown in FIGS. 9–17, inventive frame 4 comprises: circular right side plate 8; circular left side plate 10; a top support structure 222 extending between plates 8 and 9; a bottom support structure 224 extending between plates 8 and 10; and foot structure 18 extending from bottom support structure 224. Top and bottom support structures 222 and 224 support and hold side plates 8 and 9 in a spaced relationship such that side plates 8 and 9 are substantially parallel.

Foot structure 18 is most preferably integrally formed with bottom support structure 224. The integral formation of foot 18 with support 224 contributes to the attainment of the inventive low profile. Additionally, to further ensure that inventive reel 2 has a desirably low profile when placed on a fishing rod, bottom support structure 224 and foot 18 are preferably positioned between right and left side plates 8 and 10 such that the spacing of the lowermost portion 248 of foot 18 above the lowermost point 250 of frame 4 is in the range of from about 15 percent to about 40 percent of the distance from lowermost point 250 of frame 4 to the uppermost point 252 of frame 4. Most preferably, the spacing of lowermost portion 248 above point 250 is in the range of from about 20 percent to about 30 percent of the distance from point 250 to point 252.

Figure 10:
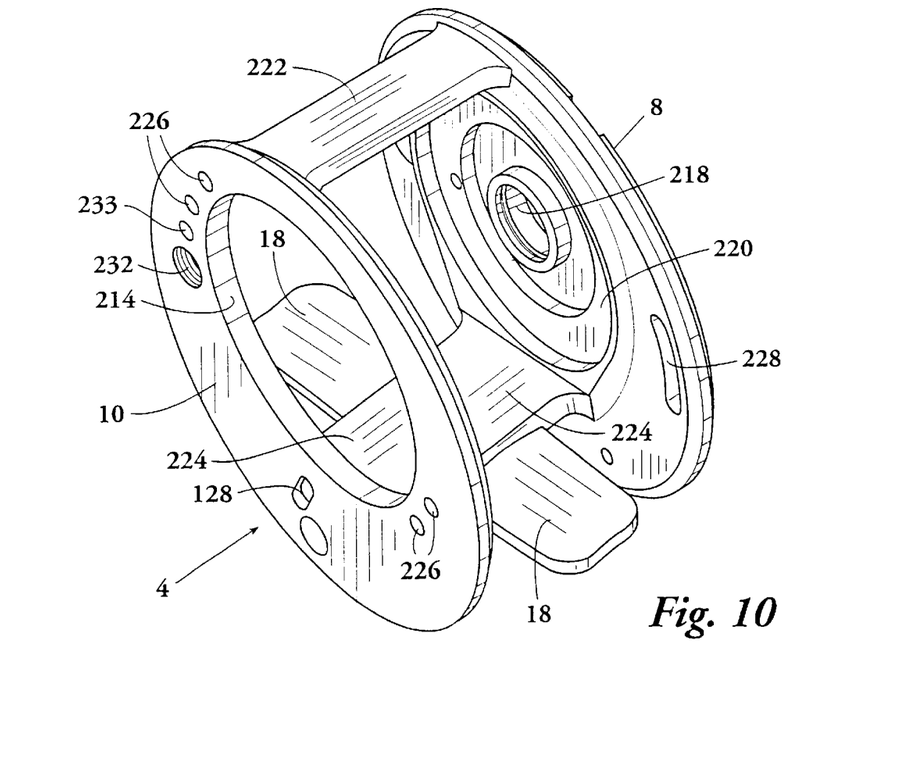
FIG. 10 provides a left side perspective view of inventive frame 4.
Figure 11:
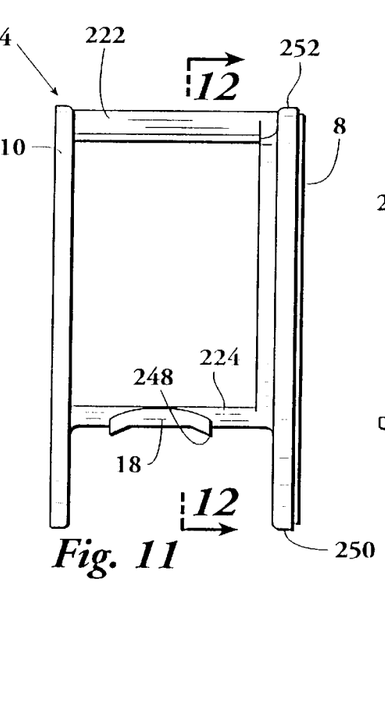
FIG. 11 provides an elevational rear view of inventive frame 4.
Figure 12:
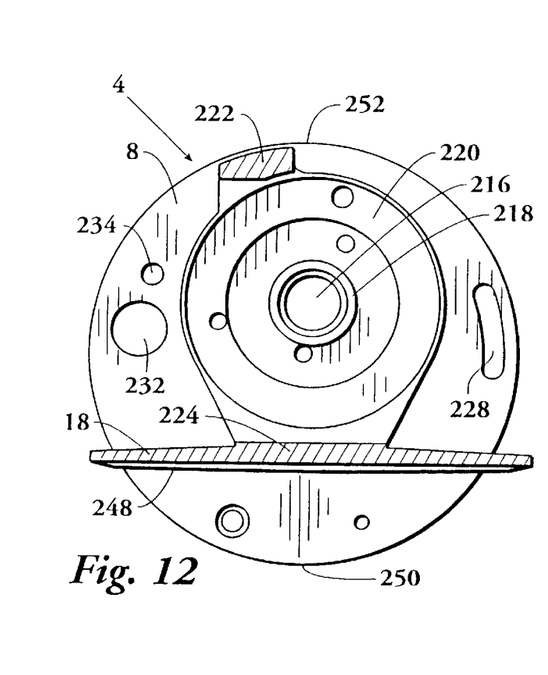
FIG. 12 provides a cutaway, elevational side view of inventive frame 4 as seen from perspective 12—12 shown in FIG. 11.
Figure 16:
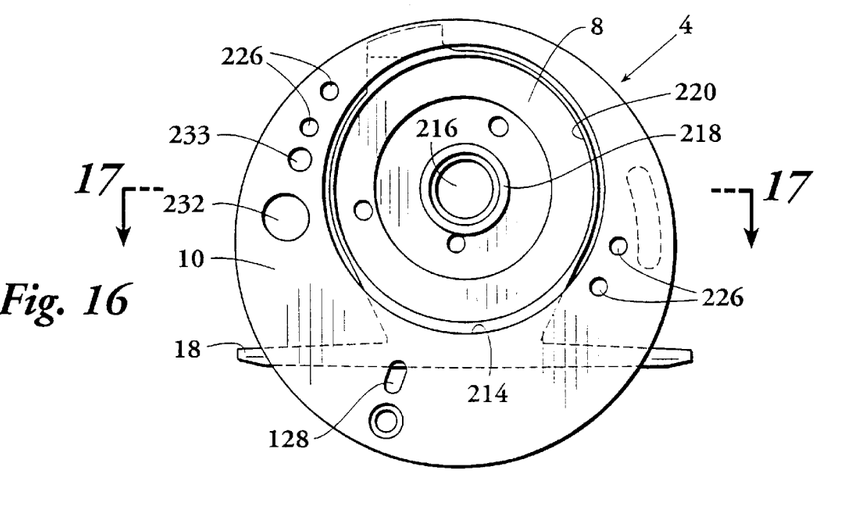
FIG. 16 provides an elevational left side view of inventive frame 4.
Figure 17:
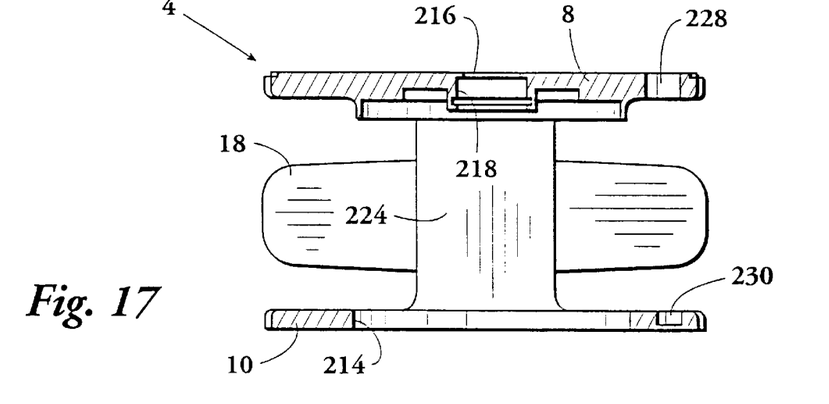
FIG. 17 provides a cutaway top view of inventive frame 4 as seen from perspective 17—17 shown in FIG. 16.

The left side plate 10 of inventive frame 4 includes: slot 128 for receiving locking pin 78; a large, circular aperture 214 through which line spool 6 is received; threaded bores 226 for attaching cover-retaining members 40; a circular aperture 232 for holding the worm shaft guide 231 of level winding mechanism 16; a circular aperture 233 for holding the left end of the carrier guide 235 used in level winding mechanism 16; and a curved, interior groove 230 for receiving the left end of thumb lever 210.

Figure 9:
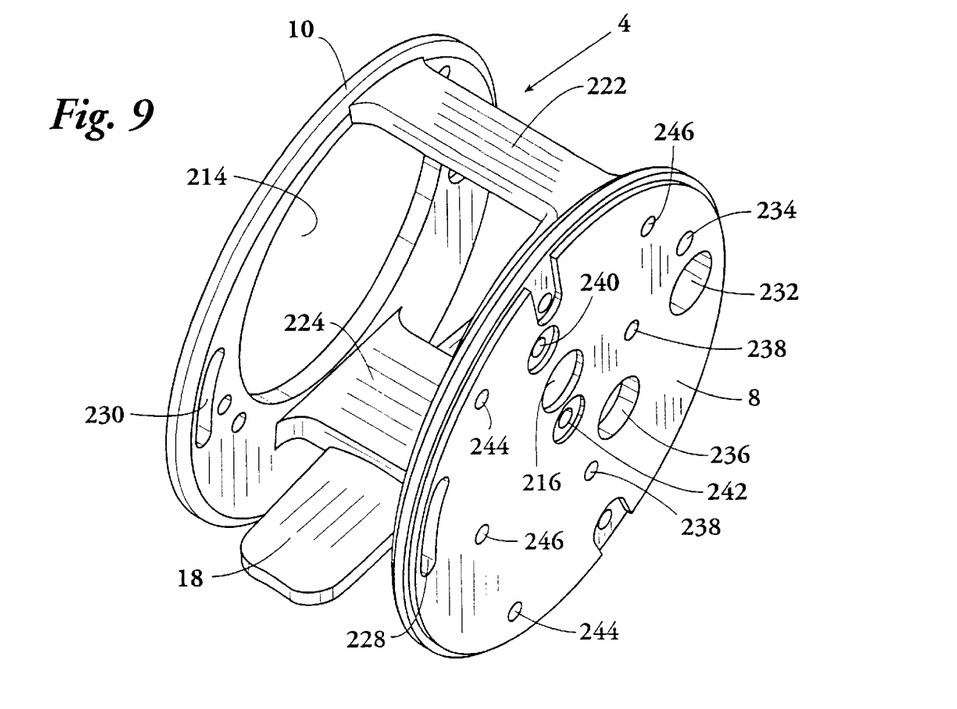
FIG. 9 provides a right side perspective view of inventive frame 4.
Figure 13:
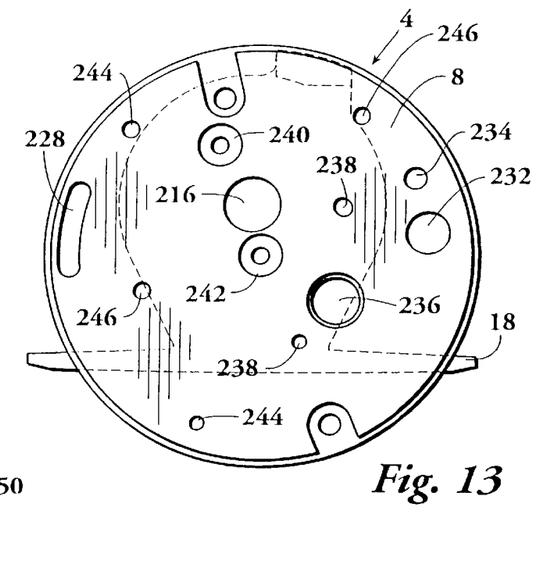
FIG. 13 provides an elevational right side view of inventive frame 4.
Figure 14:
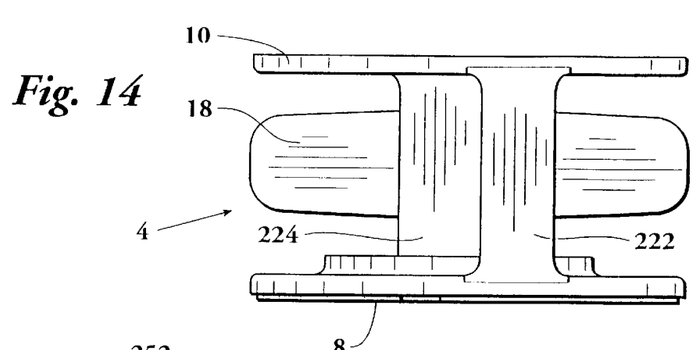
FIG. 14 provides a top view of inventive frame 4.
Figure 15:
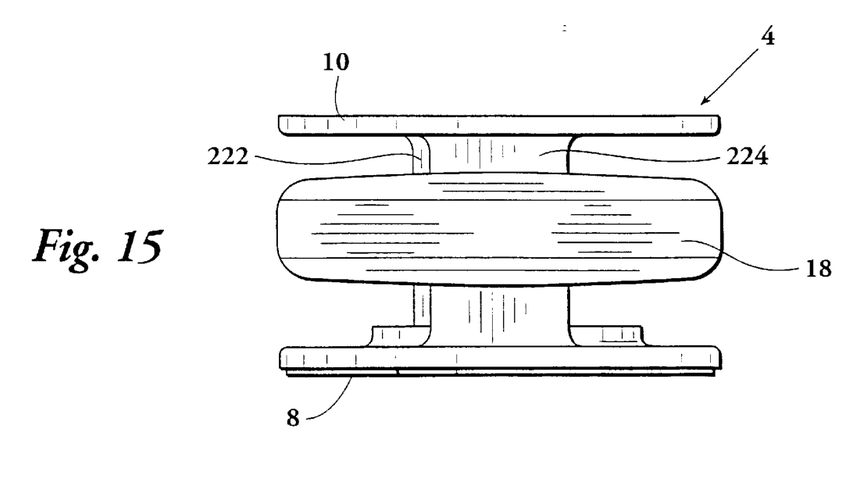
FIG. 15 provides a bottom view of inventive frame 4.

The right side plate 8 of inventive frame 4 includes: a bearing cup 218 for holding a spool shaft bearing; a spool shaft aperture 216 extending through bearing cup 218; a large interior recess 220 formed around bearing cup 218 for receiving the right end of line spool 6; a curved thumb lever slot 228 through which thumb lever 210 is received; a circular aperture 232 for holding the right end of worm shaft guide 231; an aperture 234 for holding the right end of the carrier guide 235; a bore 236 for holding crankshaft bearing 170; a pair of threaded bores 238 for attaching bearing retainer 172; bores 240 and 242 for attaching exterior guideposts 204 and 207 used in actuator assembly 134; threaded bores 244 for attaching torsion spring screws 245; and threaded bores 246 for attaching yoke retainers 196.

Figures 18, 19:
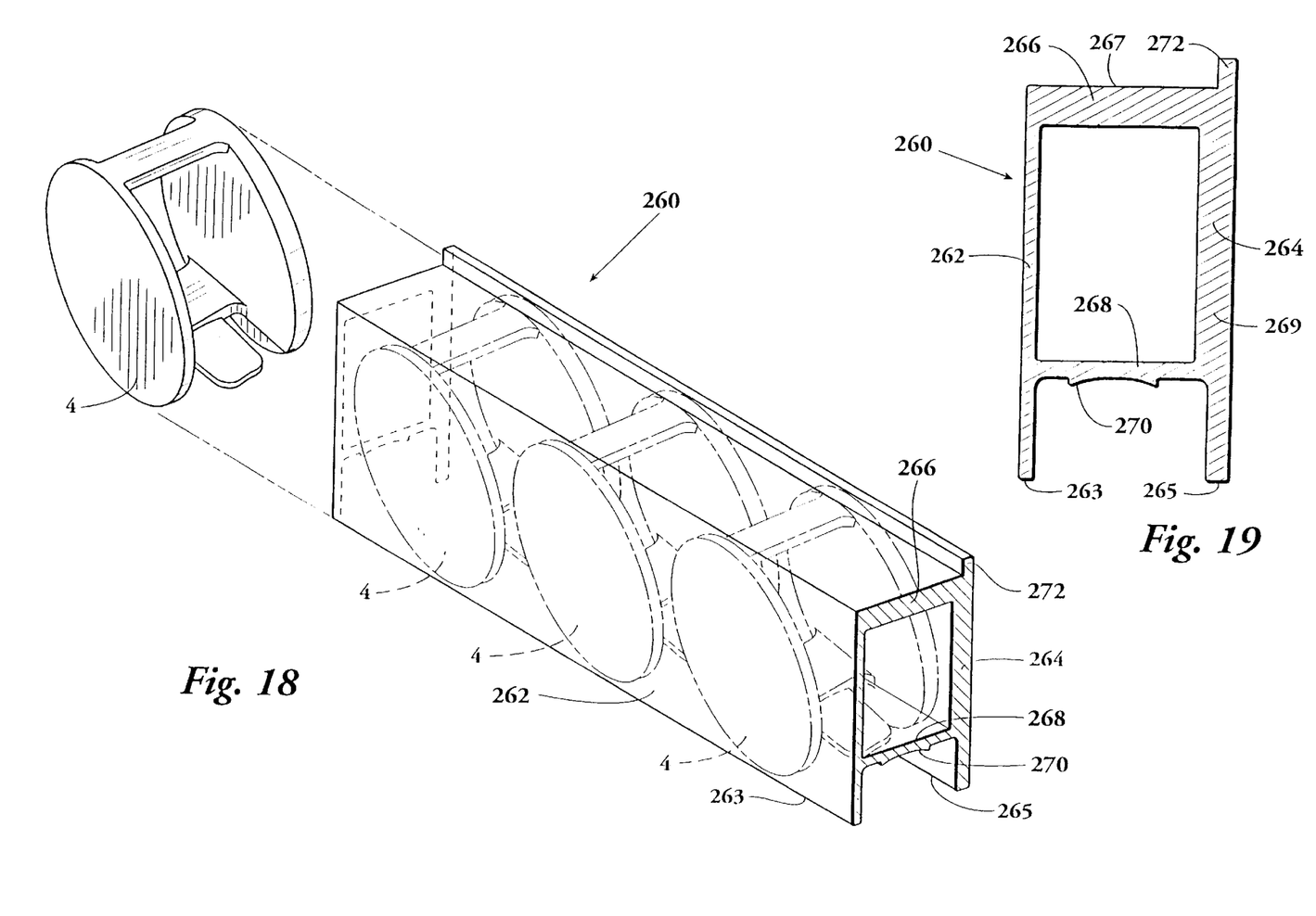
FIG. 18 provides a perspective view of an elongate segment of extruded bar stock 260 used in the method of the present invention for producing an inventive frame 4.
FIG. 19 provides an elevational end view of bar stock segment 260.

The present invention also provides a novel method wherein a plurality of frames 4 are produced from an elongate starting piece 260 of the type depicted in FIGS. 18 and 19. Elongate starting piece 260 is preferably a unitary extruded member. Elongate starting piece 260 is most preferably an extruded bar stock formed by an aluminum mill extrusion process. Starting piece 260 comprises: an elongate, longitudinal left side wall 262; an elongate, longitudinal right side wall 264 spaced apart from, and running substantially parallel to, left side wall 262; an elongate, longitudinal upper cross structure 266 connected between the tops of side walls 262 and 264; and an elongate, longitudinal lower cross structure connected between side walls 262 and 264. A curved characteristic/protrusion 270 having a shape corresponding to that of the bottom of foot 18 is provided along the bottom of lower longitudinal cross structure 268.

Starting piece 260 preferably also includes along its top an elongate ridge 272. Elongate ridge 272 is used for clamping piece 260 for machining purposes. When no longer needed in the machining process, ridge 272 is preferably removed.

To ensure that the frames 4 formed from elongate starting piece 260 will provide the low profile characteristic of the present invention, elongate starting piece 260 is preferably configured such that the spacing of the lowermost edges of curved protrusion 270 above the bottom edges 263 and 265 of sidewalls 262 and 264 is in the range of from about 15 percent to about 40 percent of the distance from bottom edges 263 and 265 to the top 267 of upper longitudinal cross structure 266. Most preferably, the spacing of the lowermost edges of curved protrusion 270 above bottom edges 263 and 265 is in the range of from about 20 to about 30 percent of the distance from bottom edges 263 and 265 to the top 267 of upper cross structure 266.

Using an extruded starting piece for forming inventive frames 4 allows much greater alloy selection and eliminates or greatly reduces the need for additives deleterious to anodizing and finishing. Using an extruded starting piece for forming frames 4 also provides a uni-directional grain structure. Thus, the inventive method allows the attainment of a thick, bright anodized finish and provides (a) high strength, (b) low porosity, (c) a thick (i.e., 0.004 inches or greater), bright, attractive, anodized finish, and (d) high corrosion and scratch resistance.

In addition to the advantages just mentioned, the inventive method allows the use of highly efficient and precise machining processes. In one embodiment of the inventive method, a three-stage machining process is used to produce a desired number (preferably a plurality) of individual frames 4 from a single elongate starting piece 260. The three stages of the process are (1) a left side machining stage, (2)

a right side machining stage, and (3) a finishing stage. As will be apparent, the order of these stages and of the steps included in the stages can be changed as desired.

The left side machining stage preferably begins by clamping elongate starting piece 260 to a machining cube or other machining structure such that the exterior of the left side wall 262 of starting piece 260 is oriented for machining. A series of spool apertures 214 and other "exterior" left side plate features (i.e., bores 226, 232, and 233 and slots 128) for the individual frames 4 are then machined on or through elongate left side wall 262. Next, a corresponding series of bearing cups 218 and other "interior" right side plate features are machined on or through the interior face of elongate right side wall 264. These right side interior features are formed by inserting machining tools through the spool apertures 214 or other left side features formed in the preceding step. As seen in FIG. 19, right side wall 264 is provided with a relatively thick upper portion 269 which allows the formation therein of bearing cups 218.

The first stage preferably also includes the step of cutting a series of round profiles 290 in left sidewall 262. Profiles 290 are cut to depths not exceeding the eventual locations of the left edges of foot structures 18. Round profiles 290 form the left side plates 10 of the individual frames 4 and are cut to include a complete set (including a separate one of spool apertures 214) of the other left side plate features formed in stage 1.

In the right side machining stage (stage 2) of the inventive process, elongate starting piece 260 is rotated such that the exterior of right side wall 264 is oriented for machining. A series of "exterior" right side plate features (i.e., crankshaft bearing cavity 236, curved thumb lever slot 228, etc.) corresponding to the series of features formed in stage 1 are then machined on or through elongate right side wall 264. Next, a series of thumb lever grooves 230 and other "interior" left side plate features are machined into the interior face of elongate left side wall 262. These interior left side features are preferably formed by inserting appropriate machining tools through the exterior right side plate features formed in the previous step. Using substantially the same procedure as in stage 1, stage 2 is preferably completed by cutting a series of round profiles in right side wall 264 and thereby severing the individual frames 4 from starting piece 260. These round profiles provide the right side plates 8 of the individual frames 4.

In the finishing stage (stage 3) of the inventive process, the individual frames 4 are preferably mounted on a machining structure whereupon a milling head is employed to finish the frames. The milling head is preferably used to (a) form top support structures 222 from the portions of upper cross structure 266 included in individual frames 4, (b) form foot structures 18 from the portions of lower cross structure 268 included in the individual frames, and (c) machine any remaining interior or other features of the individual frames 4. Upon completion of stage 3, the individual frames 4 are ready for bead blasting, anodizing, and/or any other desired finishing operation.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed:

1. A fishing reel frame produced by a method comprising the step of machining an integral, extruded starting piece to produce a plurality of individual frames, said starting piece comprising a longitudinal first sidewall and a longitudinal second sidewall having a spaced relationship with respect to said first sidewall such that said second sidewall is spaced apart from said first sidewall, and said starting piece further comprising at least one cross-structure holding said first and second sidewalls in said spaced relationship;

wherein said starting piece is produced by an extrusion process which imparts to said starting piece a unidirectional grain structure; and said extrusion process is effective for imparting to said starting piece a lower porosity level than is obtainable by casting.

2. The fishing reel frame of claim 1 wherein said extrusion process is an aluminum mill extrusion process.

3. The fishing reel frame of claim 2 wherein said fishing reel frame has an anodized finish which is at least 0.0004 inches thick.

4. The fishing reel frame of claim 2 wherein said fishing reel frame has an anodized finish and wherein said extrusion process is effective for producing said starting piece such that said anodized finish has a greater degree of scratch resistance and corrosion resistance than is obtainable by anodizing a cast aluminum product.

5. The fishing reel frame of claim 1 wherein said individual frames each comprise a portion of said cross-structure and said method further comprises the step of forming said portion of said cross structure into a foot structure such that said foot structure is an integral portion of said individual frame, said foot structure being directly placeable on a fishing rod for mounting said fishing reel frame on said fishing rod.

6. The fishing reel frame of claim 5 wherein:

said foot structure has a bottom shape and said extrusion process imparts to said cross-structure a bottom characteristic corresponding to said bottom shape.

7. The fishing reel frame of claim 5 wherein said individual frames each comprise a portion of said first sidewall and a portion of said second sidewall.

8. The fishing reel frame of claim 7 wherein said method includes the steps of shaping said portion of said first sidewall to form a substantially circular first side plate and shaping said portion of said second sidewall to form a substantially circular second side plate.

9. The fishing reel frame of claim 7 wherein:

said method includes the step of forming a series of spool apertures through said first side wall and said portions of said first side wall each include a separate one of said spool apertures.

10. The fishing reel frame of claim 7 wherein said extruded piece has a lower most point and said cross-structure is spaced above said lower most point such that:

said individual frame has an uppermost point and a bottommost point, said uppermost point being spaced a first distance above said bottommost point;

said foot structure has a bottom spaced a second distance above said bottommost point; and said second distance is in the range of from about 15 percent to about 40 percent of said first distance.

11. The frame of claim 10 wherein said second distance is in the range of from about 20 to about 30 percent of said first distance.

12. A unitary frame for a fishing reel comprising a uni-directional grain structure and having a lower porosity than is obtainable by casting.

13. The unitary frame of claim 12 wherein said fishing reel is a baitcasting reel.

14. The unitary frame of claims 12 wherein said unitary frame is a unitary structure having said uni-directional grain structure, said unitary structure comprising:

a first wall;

a second wall spaced apart from said first wall; and a support structure extending between said first and second walls.

15. The unitary frame of claim 14 wherein said unitary structure further comprises a mounting foot integrally formed on said support structure, said mounting foot being directly placeable on a fishing rod for mounting said frame on said fishing rod.

16. The unitary frame of claim 12 wherein said unitary frame is an aluminum frame having an anodized finish which is at least 0.0004 inches thick.

* * * * *